Figure 1:
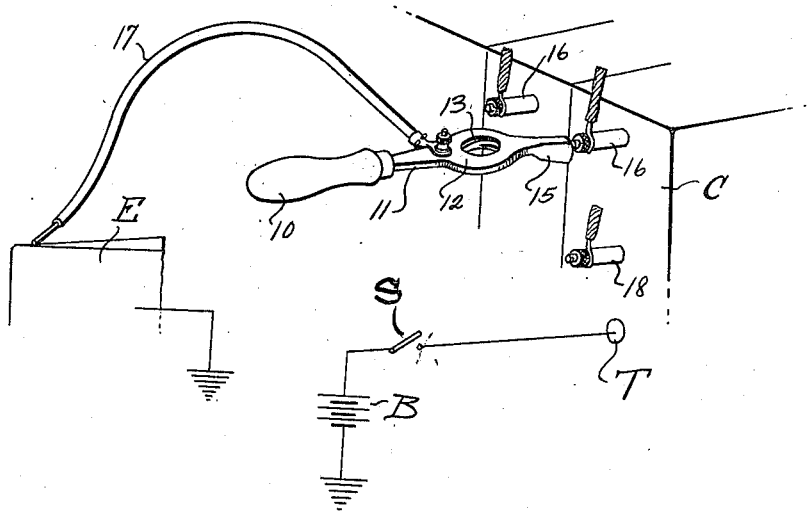

Apr. 10, 1923.

W. M. NEAR

TESTING PROD

Filed May 18, 1921

1,451,233

Inventor
W. M. Near.

Watson E. Coleman
Attorney.

Patented Apr. 10, 1923.

1,451,233

UNITED STATES PATENT OFFICE.

WILMER M. NEAR, OF NEW ERA, MICHIGAN.

TESTING PROD.

Application filed May 18, 1921. Serial No. 470,728.

*To all whom it may concern:*

Be it known that I, WILMER M. NEAR, a citizen of the United States, residing at New Era, in the county of Oceana and State of Michigan, have invented certain new and useful Improvements in Testing Prods, of which the following is a specification, reference being had to the accompanying drawings.

This invention relates to improvements in testing prods and has for an important object thereof the provision of a device particularly well adapted for the testing of the coils and spark plugs of automobile engines, the circuits of which include the type of vibrator coil commonly employed on the Ford car.

A further object of the invention is to provide a device of this character which is extremely simple in construction and operation and of such small size as to occupy but little space in the tool kit.

Other objects and advantages of the invention will become apparent throughout the course of the following description.

Figure 2:
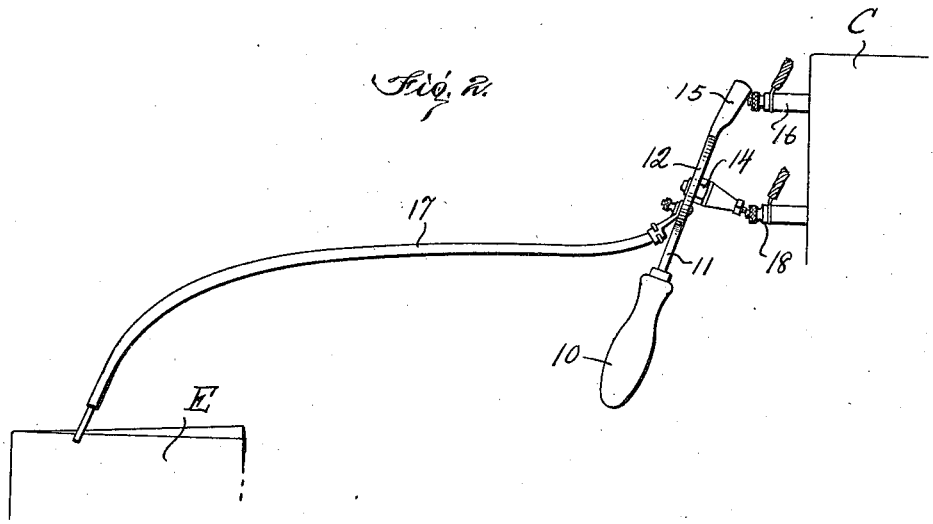

In the accompanying drawings wherein for the purpose of illustration is shown a preferred embodiment of my invention, and wherein like reference characters designate like parts throughout:

Figure 1 is a perspective view partially diagrammatic, showing a prod constructed in accordance with my invention in use for testing the coils; and Figure 2 is a side elevation showing the same employed for testing a spark plug.

Referring now more particularly to the drawings, the numeral 10 indicates an insulatory handle of any suitable material, and the numeral 11 a conducting body portion which is enlarged intermediate its ends, as at 12, and provided in such enlargement with a threaded opening 13 adapted for the reception of the threaded cylinder engaging portion of a spark plug 14. The end of the prod is preferably thickened to afford a solid engaging surface, as at 15.

In the use of my device for testing the coils of the circuit, the ignition switch S is first closed, completing the circuit through the battery to one terminal T of the primary of the coil, the other terminal of the battery being grounded in the usual manner. The end 15 of the testing prod is then engaged with the other terminal 16 of the primary. To the body 11 of the prod, as by means of a binding post, a flexible conducting element 17 is secured, preferably taking the form of an insulated wire, and the end of this wire is now engaged with the engine E or some other metallic part of the car, completing the circuit through the coil. The secondary of the coil will now become active and where the coils are of the vibratory type the vibrator will buzz, and the strength or condition of the coil may be determined by the sound emitted. In testing the coils, if there is excessive sparking at the coil points, a defective condenser is indicated. The vibrator of the coils is old and well known and is not claimed by me as part of my invention, I do not herein illustrate the same.

When it is desired to test a spark plug, the same is engaged in a threaded opening 13 of the enlargement 12, and the end 15 engaged with the primary of the coil, the switch being closed as above described. The binding post of the spark plug is now engaged with the terminal 18 of the secondary winding of the coil, and the conductor 17 engaged with a metallic portion of the car, as heretofore described; this results in the completion of both the primary and secondary circuits of the coil C, and if the spark plug is in good condition sparks will flow across the gap thereof. If the buzzer of the coil acts and the plug fails to spark, a defective spark plug is indicated.

Many changes being possible in the shape, size and arrangement of the various parts of the prod hereinbefore set forth without in any manner departing from the spirit of my invention, I do not limit myself to the specific structure thereof except as hereinafter claimed.

What I claim is:

1. In a device for testing coils and spark plugs, a testing prod comprising a body portion having a threaded opening formed therein adapted for the reception of the threaded portion of the spark plug and so arranged that when an end of the prod is engaged with a primary contact of the coil the spark plug terminal may be engaged with a secondary contact of the coil, and means for electrically connecting the body portion with the ground of the car.

2. A device for testing coils and spark plugs comprising a conductor provided centrally with an opening adapted for the reception of a spark plug, a handle engaged with one end of the conductor, and a flexible conductor connected with the first named conductor, the free end of the first named conductor being so spaced from the spark plug receiving opening that it may be engaged with a primary contact of a coil with the spark plug terminal of a spark plug held within the opening engaged with the secondary contact of the coil.

In testimony whereof I hereunto affix my signature.

WILMER M. NEAR.